United States Patent
Peh

(10) Patent No.: US 7,246,117 B2
(45) Date of Patent: Jul. 17, 2007

(54) ALGORITHM FOR FAST DISK BASED TEXT MINING

(75) Inventor: Thomas Peh, Heidelberg (DE)

(73) Assignee: SAP AG, Walldorf (DE)

( * ) Notice: Subject to any disclaimer, the term of this patent is extended or adjusted under 35 U.S.C. 154(b) by 497 days.

(21) Appl. No.: 10/815,253

(22) Filed: Mar. 31, 2004

(65) Prior Publication Data
US 2005/0222997 A1 Oct. 6, 2005

(51) Int. Cl.
G06F 7/00 (2006.01)
G06F 17/30 (2006.01)
(52) U.S. Cl. .................. 707/4; 707/3; 707/5
(58) Field of Classification Search ............. 707/1, 707/3, 4–6; 709/203
See application file for complete search history.

(56) References Cited

U.S. PATENT DOCUMENTS

| 5,692,176 | A | * | 11/1997 | Holt et al. ............... 707/5 |
| 5,941,944 | A | * | 8/1999 | Messerly ............... 709/203 |
| 2002/0099685 | A1 | * | 7/2002 | Takano et al. ............ 707/1 |
| 2003/0065658 | A1 | * | 4/2003 | Matsubayashi et al. ...... 707/4 |
| 2003/0101177 | A1 | * | 5/2003 | Matsubayashi et al. ...... 707/6 |
| 2003/0195877 | A1 | * | 10/2003 | Ford et al. ............... 707/3 |

OTHER PUBLICATIONS

Voorhees, Ellen. "The Efficiency of Inverted Index and Cluster Searches", 1986, ACM Press, Proceedings of the 9th annual international ACM SIGIR conference on Research and development in information retrieval, pp. 164-174.*

Kaszkiel et al., "Passage Retrieval Revisited", 1997, ACM Press, Proceedings of the 20th annual international ACM SIGIR conference on Research and development in information retrieval.*

* cited by examiner

Primary Examiner—Charles Rones
Assistant Examiner—Charles Adams
(74) Attorney, Agent, or Firm—Mintz, Levin, Cohn, Ferris, Glovsky & Popeo, P.C.

(57) ABSTRACT

Methods and apparatus, including computer systems and program products, for executing a query, for example, a query for a document similar to another document. In one general aspect, the techniques feature a method of executing a query for at least one document similar to a specified document. That method includes receiving the query; forming a reduced query document based on ranks of terms in the specified document; generating a modified query based on the query and the reduced query document; executing the modified query on a data repository to generate a set of results; and, providing a result to a user interface.

16 Claims, 3 Drawing Sheets

ALGORITHM FOR FAST DISK BASED TEXT MINING

BACKGROUND

The following description relates to information management systems and techniques for information retrieval.

In a situation where people wish to find information in a large collection of documents that have been stored electronically, some form of search technology may be employed. A system that employs search technology is known as an information management system and may include a data repository where collections of documents are stored. A user of an information management system may wish to search documents scattered within a data repository to obtain various types of information. For example, a user may wish to extract statistical information about terms used in documents or identify sets of documents that are similar to given documents. The technology employed to achieve those ends may be described generically as text-mining functionality.

In many implementations, text-mining functionality is based on a mathematical model called the vector space model. In the vector space model, terms may correspond to dimensions in a vector space, and documents may correspond to vectors, such that each nonzero component of a document vector corresponds to a term that appears in a corresponding document. A matrix of document vectors and the terms in the document vectors may be known as a term-document matrix.

In the scenario where a user wishes to identify sets of documents that are similar to one or more given documents, the time and resources required to calculate similarity are considerable. For example, in some implementations of the vector space model, if similarity values are calculated over a term-document matrix for millions of documents, the running time may range from multiple hours to several days. In addition, the task of obtaining quality results and minimizing the calculation overhead may be challenging.

SUMMARY

Described herein are methods and apparatus, including computer program products, that implement techniques for information retrieval.

In one general aspect, the techniques feature a method of executing a query for at least one document similar to a specified document. That method includes receiving the query; forming a reduced query document based on ranks of terms in the specified document; generating a modified query based on the query and the reduced query document; executing the modified query on a data repository to generate a set of results; and providing a result to a user interface.

Implementations may include one or more of the following features. The result may include a document that is similar to the specified document and/or a list of references to documents that are similar to the specified document. The result may indicate that no similar document was found in the data repository. Forming the reduced query document based on ranks of terms in the specified document may exclude terms that are less selective. Forming the reduced query document based on ranks of terms in the specified document may include calculating a rank of at least one term in the specified query document; calculating a square of each rank; calculating a normalized rank for each square; sorting a list of normalized ranks including the normalized rank; calculating a partial sum for each normalized rank in the list of normalized ranks; and including, in the reduced query document, terms corresponding to a partial sum above a threshold value.

The data repository may be modeled in accordance with a vector space model and executing the modified query may include calculating the similarity of the reduced query document with a comparison document in the data repository in accordance with the function $Q \cdot D/|Q|*|D|$ where Q is the reduced query document, D is the comparison document, $Q \cdot D$ is a scalar product of column vectors corresponding to each document such that each column is a vector including ranks of terms in the documents, and $|Q|*|D|$ is a normalization factor. The normalization factor may be the product of the norms of the column vectors corresponding to each document calculated in accordance with the equation $\text{sqrt}(q1^2+ \ldots +qT^2)*\text{sqrt}(d1^2+ \ldots +dT^2)$ where sqrt signifies square root, q1 through qT are ranks of terms in the reduced query document, d1 through dT are ranks of terms in the comparison document, and T is the number of terms in an index of document vectors generated in accordance with the vector space model of the data repository. The scalar product of the column vectors may be calculated in accordance with the equation $(q1.d1+q2.d2+ \ldots +qT.dT)$ where q1 through qT are ranks of terms in the reduced query document, d1 through dT are ranks of terms in the comparison document, and T is the number of terms in an index of document vectors generated in accordance with the vector space model of the data repository.

In another aspect, an information management system includes a data repository that is configured to store documents and a program for executing queries on the data repository. In that case, the program is operative to receive a query for at least one document similar to a specified document; form a reduced query document based on ranks of terms in the specified document; generate a modified query based on the query and the reduced query document; execute the modified query on the data repository to generate a set of results; and provide a result to a user interface.

Implementations may include one or more of the following features. The result may include a document that is similar to the specified document and/or the result may include a list of references to documents that are similar to the specified document. The result may indicate that no similar document was found in the data repository. The operation of forming the reduced query document based on ranks of terms in the specified document may exclude terms that are less selective. The operation of forming the reduced query document based on ranks of terms in the specified document may include calculating a rank of at least one term in the specified query document; calculating a square of each rank; calculating a normalized rank for each square; sorting a list of normalized ranks including the normalized rank; calculating a partial sum for each normalized rank in the list of normalized ranks; and including, in the reduced query document, terms corresponding to a partial sum above a threshold value.

The data repository may be modeled in accordance with a vector space model and the operation of executing the modified query may include calculating the similarity of the reduced query document with a comparison document in the data repository in accordance with the function $Q \cdot D/|Q|*|D|$ where Q is the reduced query document, D is the comparison document, $Q \cdot D$ is a scalar product of column vectors corresponding to each document such that each column is a vector including ranks of terms in the documents, and $|Q|*|D|$ is a normalization factor. The normalization factor may be the product of the norms of the column vectors corresponding to each document calculated in accordance with the equation $\text{sqrt}(q1^2+\ldots+qT^2)*\text{sqrt}(d1^2+\ldots+dT^2)$ where sqrt signifies square root, q1 through qT are ranks of terms in the reduced query document, d1 through dT are ranks of terms in the comparison document, and T is the number of terms in an index of document vectors generated in accordance with the vector space model of the data repository. The scalar product of the column vectors may be calculated in accordance with the equation $(q1.d1+q2.d2+\ldots+qT.dT)$ where q1 through qT are ranks of terms in the reduced query document, d1 through dT are ranks of terms in the comparison document, and T is the number of terms in an index of document vectors generated in accordance with the vector space model of the data repository.

The information management systems and techniques for information retrieval described here may provide one or more of the following advantages.

A technique for calculating similarity of documents in an information management system may involve calculating a scalar product over a subset of terms in an index of documents rather than over all terms that are in the index. This may advantageously reduce time spent determining similarity of documents and may generate high quality results. In addition, it may allow memory, of a computer system that determines similarity of documents, to be used more efficiently because only part of a term-document matrix corresponding to the subset of terms might be held in the memory. The rest of the matrix may be stored on a storage device, such as a hard disk, and accessed as required. According to this technique, accesses to a storage device of the matrix may be infrequent, thus performance need not be unduly impacted by disk accesses. Also, memory resources may be leveraged because only portions of a term-document matrix corresponding to a subset of terms may be stored in memory as opposed to storing the entire term-document matrix in memory.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference numbers and designations in the various drawings indicate like elements.

DETAILED DESCRIPTION

The systems and techniques described here relate to information management systems and techniques for information retrieval.

A Vector Space Model

Figure 1:
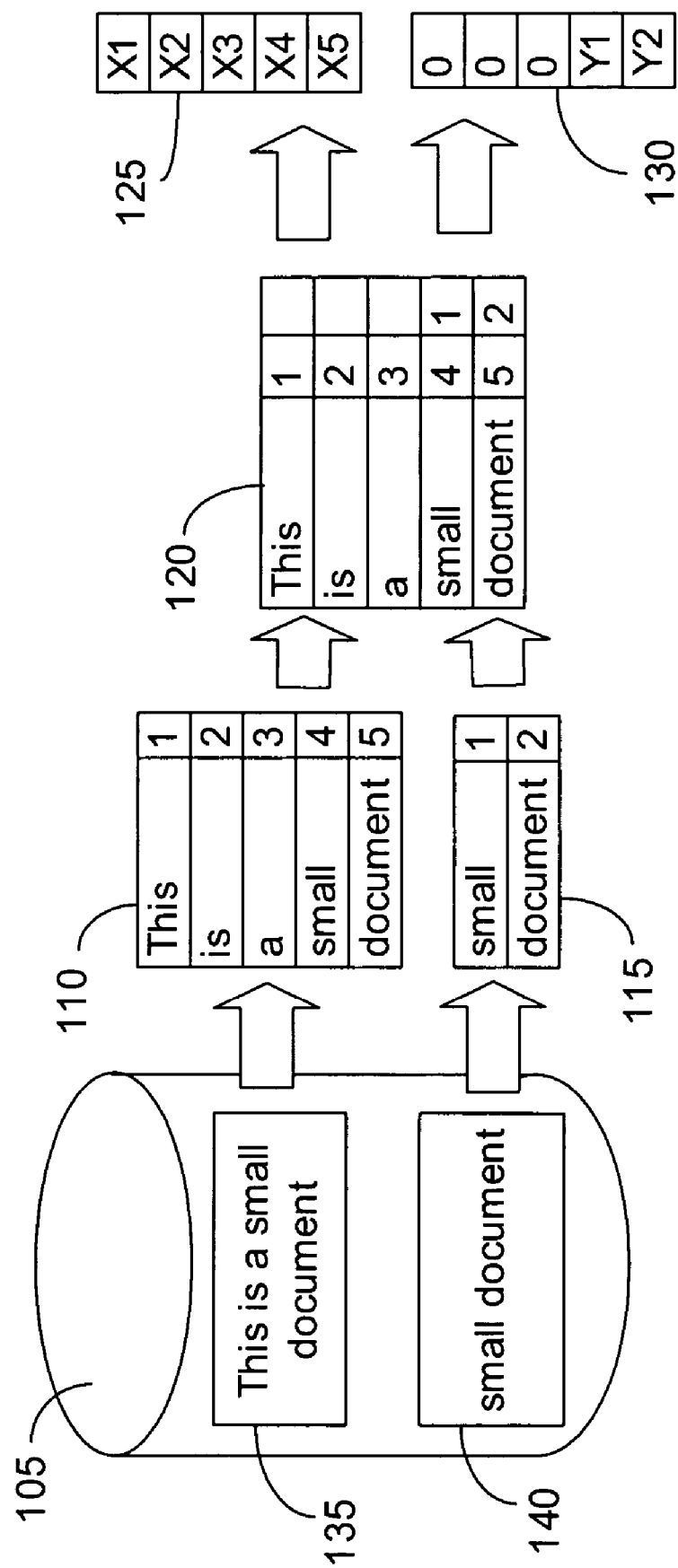
FIG. 1 illustrates an implementation of a vector space model of a data repository.

FIG. 1 illustrates an implementation of a vector space model of a data repository 105. FIG. 1 includes a data repository 105, which is part of an information management system; document indexes 110 and 115; an index 120 for a document collection; and column vectors 125 and 130. The data repository 105 stores a collection of documents, including documents 135 and 140. Each document in the collection is an ordered collection of any number of terms. Terms may be, for example, words, characters, or symbols. Although documents 135 and 140 may appear as word processing documents, documents in the data repository 105 may be generated by any type of computer program and may be in any of a number of formats. Also, the documents need not be files in a data repository; for example, the documents may be lists of terms. In alternative implementations the data repository 105 need not be part of an information management system. For example, the data repository 105 may be accessed by an information management system.

Each document is represented, in the information management system, as a set of the terms appearing in the document, together with the addresses in the document of the respective locations of those terms. For example, the document 135 which includes the text "This is a small document" may be represented as the set {a [3], document [5], is [2], small [4], This [1]}, where each number in brackets indicates an ordinal position in the document of the term immediately preceding the number. Such a set may be written as a list without repetitions and presented in any desired order. In alternative implementations different techniques may be used to represent the documents in the information management system.

The document indexes 110 and 115 are generated from the set of terms appearing in their corresponding documents 135 and 140, respectively, in such a manner as to give the one or more addresses in the document of each of the terms that appear in the document. For example, document 140 includes the terms "small" and "document," and the corresponding document index 115 includes those terms with addresses 1 and 2. Thus, document indexes are analogous to an index in a book, except the addresses given are more exact. A document index may be generated for each document in the data repository 105. Although the terms in the document indexes 110 and 115 are listed in the order in which they appear, in alternative implementations terms in a document index may be listed in alphanumeric order or any other order that facilitates retrieval. Document indexes may list almost every word and symbol appearing in a document, i.e. every term, including numbers and any special characters, with few exceptions. For example, a document index might not list characters such as commas and periods, which may be part of a file of exceptions used by document indexing mechanisms.

The index 120 for a document collection indexes the document indexes 110 and 115. The index 120 may be obtained by merging indexes for individual documents. Each term listed in the index 120 is associated with a list of addresses indicating where the term appears in the respective documents 135 and 140 of the data repository 105. The index 120 is represented as a table in which columns correspond to individual documents and rows correspond to individual terms, where each cell in the table contains a list of numbers representing the respective addresses at which the term for that cell appears in a corresponding document. Alternative techniques and/or mechanisms may be used to index and/or represent the collection of documents in the data repository 105.

Each of the terms in the index 120 may be described as having a rank corresponding to a rank of terms for the document in which the term exists or a rank of terms for the index 120. The rank of a term may depend on a variety of factors and is a mathematical function of the frequency of the term. The frequency of a term in a document or a collection of documents is the total number of times the term appears in the document or collection of documents. In alternative implementations, any one of a number of different mathematical functions may be used to calculate rank, where these functions may have various advantages and disadvantages relative to each other. An example of a function for calculating rank is described later in the "Calculating Rank" section.

The column vectors 125 and 130 represent the documents 135 and 140, respectively. A column vector represents ranks of terms, in a document, in a vector space. Each dimension of the column vector represents a term where there may be T dimensions, such that T is the number of terms in the corresponding index of documents. For example, each of the column vectors 125 and 130 have five dimensions corresponding to the five dimensions in the index 120 of documents and each dimension of the column vectors corresponds to a term in the respective documents 135 and 140. Each rank is a real number that is greater than or equal to zero and bounded above in a manner that may differ in different implementations of the vector space model. In alternative implementations other representations may be used to represent the rank of terms in documents.

The column vectors 125 and 130 may be used to determine if the documents are similar. Two or more documents or collections of documents are similar when their respective column vectors are sufficiently close to each other in the relevant vector space. Each such column vector may be represented visually as an arrow in the vector space, with projections onto the respective coordinate axes equal in length to ranks of terms represented by those coordinate axes. The proximity of two column vectors in a vector space may be measured by the cosine of the angle between the column vectors. In other words, two documents may be similar when there are terms in common and ranks of those terms in the two documents have comparable values. Functions for determining similarity can be defined in different ways to realize different advantages. One implementation of a similarity function is given in the section "Determining Similarity" below.

Calculating Rank

In a vector space representing a set of terms, the components of a column vector for a document or a collection of documents are numbers representing ranks R. Ranks may be defined as follows. First, term frequency (TF) is defined as the log of the number of times a term appears in a document, i.e.:

$TF = \log$ (number of times term $t$ appears in document $D$)

Term frequency is only defined where a term t appears at least once in document D. Otherwise, the definition involves taking the logarithm of zero, which is undefined. The use of the logarithm function is not essential, and merely reduces what otherwise may be a wide range of values for TF to a more reasonable range that may be more practical to use.

Where the vector space model was defined based on an index of terms, an inverse document frequency (IDF) is defined as follows. Let N be the total number of documents that are indexed, and let n be the number of documents in N that contain a given term t at least once (that is, for which TF is defined). It follows that n/N represents the fraction of the documents in N that contain term t at least once. For each such term t, a corresponding IDF is:

$IDF = \log(1 + N/n)$

Where IDF is only defined when a term t appears in at least one document in N. Otherwise, n would equal zero, and (N/n) would be infinite.

In calculating the IDF, as when calculating TF, the logarithmic function is employed to produce more reasonable numbers, since the range of possible numerical values for (N/n) may be excessively wide for practical purposes. For example, if N is a million documents and a given term appears in just one of them, then (N/n) has a value of a million whereas $\log(1+N/n)$ has a value of about 6 if logarithms are taken to the base 10 or about 20 if base 2 is used.

Also, one is added to (N/n) before taking the logarithm merely to produce more reasonable behavior, since otherwise the numerical change in IDF between cases where a given term appears in one or two documents (n=1 or n=2) may be too great, and the difference between the two cases may be unimportant in practical applications.

Both TF and IDF may be defined in a variety of ways in different implementations of the vector space model as applied to text mining and related applications.

Given a document D and a set of N indexed documents, we can now define the rank R of term t from D relative to the set N:

$Rank (R) = TF * IDF$

In alternative implementations, different functions may be used to define the rank of a term and those functions need not make use of TF or IDF.

Determining Similarity

A user of a text-mining application may submit a query involving a document Q in order to obtain a result including a set of similar documents D. To calculate the similarity between two documents Q and D, i.e. Sim(Q, D), the cosine of the angle between their vector representations in the vector space may be calculated. The cosine of the angle between vectors Q and D is the normalized (i.e. "normed") scalar product of Q and D. Following is a description of this calculation with reference to Table 1.

TABLE 1

| Query document Q | Document D1 | Document D2 | ... | Document DN |
|---|---|---|---|---|
| Term q1 | d11 | d21 | ... | dN1 |
| Term q2 | d12 | d22 | ... | dN2 |
| ... | ... | ... | ... | ... |
| Term qT | d1T | d2T | ... | dNT |
| Result vector = (sum i for i = 1 ... T) | Sum (qi · d1i) | Sum (qi · d2i) | ... | Sum (qi · dNi) |
| Normed result | Sum (qi · d1i) / \|Q\| * \|D1\| | Sum (qi · d2i) / \|Q\| * \|D2\| | ... | Sum (qi · dNi) / \|Q\| * \|DN\| |
| Similarity | Docs Q, D1 | Docs Q, D2 | ... | Docs Q, DN |

In Table 1, let T be the total number of terms t in an index of N documents D1, . . . , DN and columns Q and D be column vectors such that:

Q includes components q1, q2, . . . , qi, . . . , qT

D includes components d1, d2, . . . , di, . . . , dT

The vector components qi and di are ranks R calculated in accordance with the equation for calculating rank described above in the section "Calculating Rank." Many of the components qi and di may be the value zero because many corresponding terms might not appear in the corresponding documents.

Only the rows for which qi is nonzero may be of interest for the following calculation.

The Scalar product of vectors Q and D is Q·D, i.e.:

$Q \cdot D = (q1.d1 + q2.d2 + \ldots + qT.dT)$

The Euclidean length, or norm, of a vector is the square root of the sum of the squares of the vector components. For the cosine of the angle between vectors Q and D, the normalization factor for the scalar product is the product of the norms of Q and D, i.e.:

Normalization factor $|Q|*|D|$=sqrt($q1^2+ \ldots +qT^2$)
*sqrt ($d1^2 + \ldots dT^2$)

Thus, the similarity of documents Q and D is the quotient of the scalar product over the normalization factor, i.e.:

Sim($Q,D$)=$Q \cdot D/|Q|*|D|$

In order to determine the similarity of the document Q against other documents in the set of documents $D1, \ldots, DN$, values for the similarity of a query document Q and each of the indexed documents may be calculated iteratively over a term-document matrix. A term-document matrix is a matrix of document vectors and the terms in the document vector. A term-document matrix may be, for example, Table 1, if the last three rows were excluded.

The last three rows of Table 1 illustrate some of the processes involved in calculating similarity according the above definitions. Entries $d_{ji}$, for j from 1 to N and i from 1 to T, are ranks R calculated (see "Calculating Rank") for each term q from query document Q against the index of all N documents $D1, \ldots, DN$.

Thus, the processes performed for each query term $q_i$ for i from 1 to T may be:

1. Expand term vectors $q_i$ by writing $d_{ji}$ for j from 1 to N (see Table 1)

2. Multiply $q_i$ by each document rank $d_{ji}$ for j from 1 to N and sum the resulting products (see the equation for calculating a scalar product)

3. Normalize the result vector (see the equation for calculating a scalar product) to obtain the required similarity values (see the equation for calculating similarity)

Scoping

Figure 2:
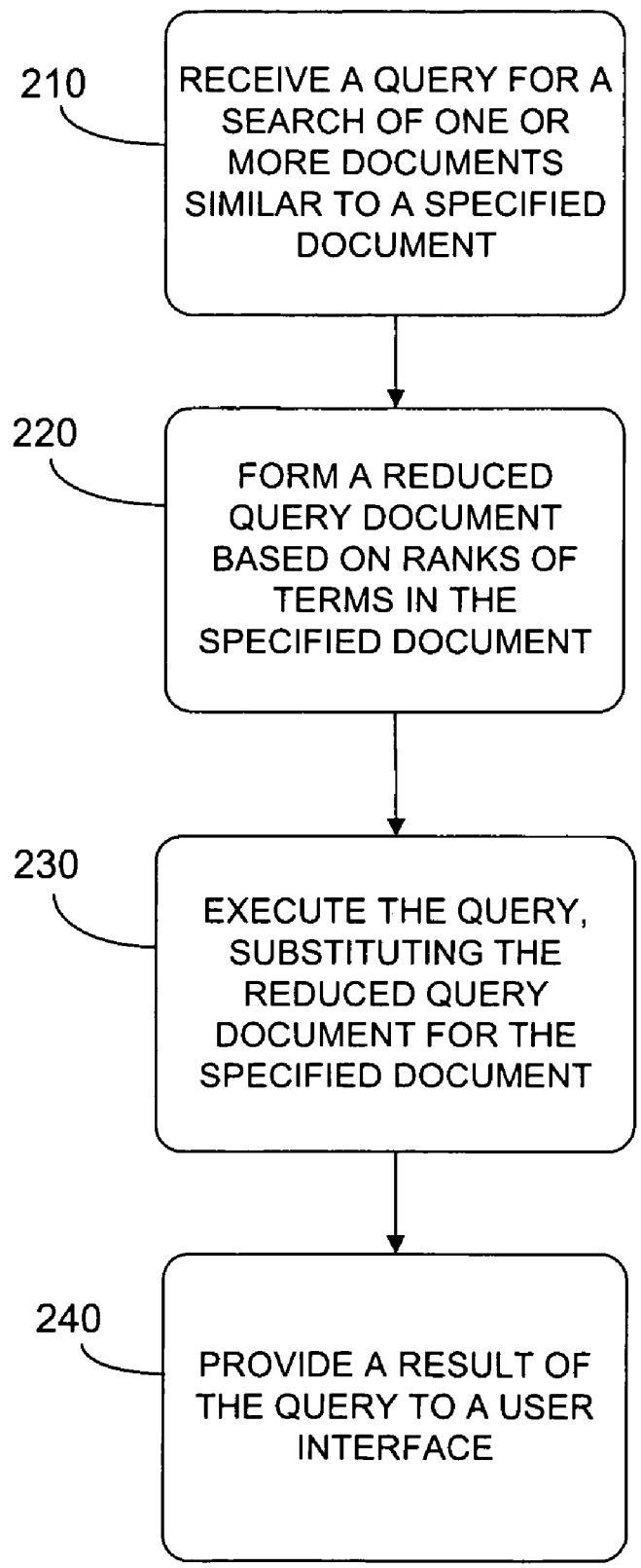
FIG. 2 is a method of retrieving similar documents.
Figure 3:
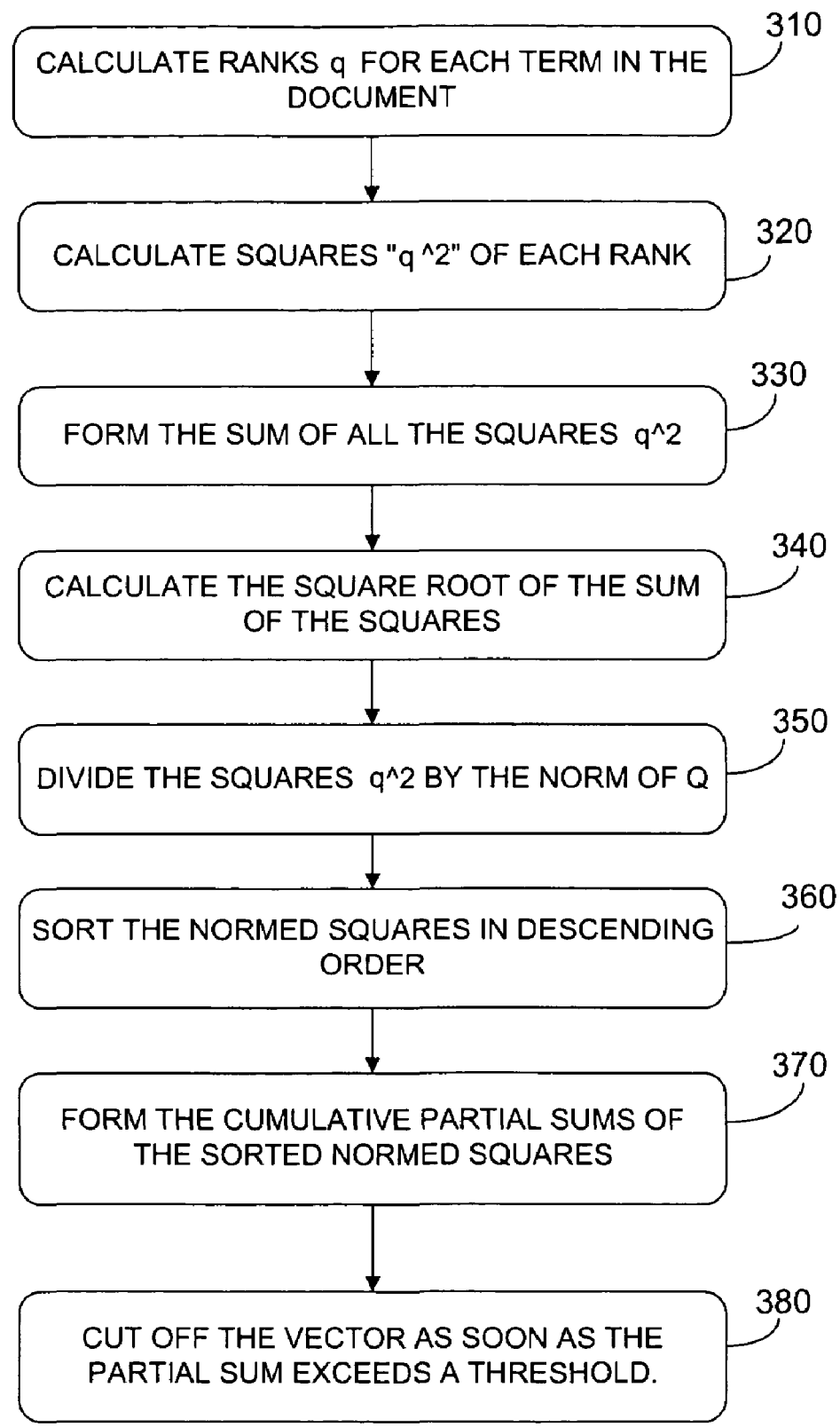
FIG. 3 is a method of forming a reduced query document.

Another technique for calculating similarity may be referred to as "scoping" and involves calculating a scalar product over a subset of terms in an index of documents rather than over all terms that are in the index. FIG. 2 is a method of retrieving similar documents in accordance with this technique. FIG. 3 is a method of forming a reduced query document. Table 2 illustrates part of an example of information retrieval, and may illustrate, in part, the methods of FIG. 2 and/or FIG. 3. FIG. 2, FIG. 3, and Table 2 will be discussed together to illustrate scoping.

At 210 a query is received for a search of documents similar to a specified document. The query may be received, via a user interface of a computer system, at an information management system. The user interface includes any combination of input and/or output devices. For example, the user interface may include a display device, a keyboard, and a mouse-pointing device. The information management system may include a data repository or may be able to access a data repository. In either case, the data repository includes documents and the data repository may be modeled based on the implementation of the vector space model described in reference FIG. 1. The specified document includes terms, which are in a specific order. With reference to Table 2, an example specified document includes terms, "Admiral Nelson fought his most famous battle at the Spanish Trafalgar Cape," where the terms in the specified document are in that order. The twelve terms of the example document are listed in the first column of Table 2, where the specified document is document Q.

TABLE 2

| Col 1<br>Document<br>Q, terms q | Col 2<br>Rank of<br>term q | Col 3<br>q^2 | Col 4<br>Normed q^2 | Col 5<br>Sorted by<br>size | Col 6<br>Partial sum | Col 7<br>Sorted<br>terms |
|---|---|---|---|---|---|---|
| Admiral | 4.39 | 19.272 | 0.179 | 0.426 | 0.426 | Trafalgar |
| Nelson | 3.97 | 15.761 | 0.146 | 0.179 | 0.605 | Admiral |
| fought | 0.88 | 0.774 | 0.007 | 0.146 | 0.751 | Nelson |
| his | 0.35 | 0.123 | 0.001 | 0.118 | 0.869 | Cape |
| most | 0.88 | 0.774 | 0.007 | 0.096 | 0.965 | Spanish |
| famous | 0.88 | 0.774 | 0.007 | 0.009 | 0.974 | battle |
| battle | 0.97 | 0.941 | 0.009 | 0.007 | 0.981 | fought |
| at | 0.43 | 0.185 | 0.002 | 0.007 | 0.988 | most |
| the | 0.43 | 0.185 | 0.002 | 0.007 | 0.995 | famous |
| Spanish | 3.22 | 10.368 | 0.096 | 0.002 | 0.997 | at |
| Trafalgar | 6.78 | 45.968 | 0.426 | 0.002 | 0.999 | the |
| Cape | 3.56 | 12.674 | 0.118 | 0.001 | 1 | his |
| Sum | | 107.7998 | 1 | 1 | | |
| sqrt( ) | | 10.38266825 | | | | |

At 220 a reduced query document is formed based on ranks of terms in the specified document. Table 2 illustrates the formation of a reduced query document based on the example specified document. The process of forming a reduced query document may be performed in Table 2 according to FIG. 3.

At 310 ranks q are calculated for each term in the specified document. For the example document, the ranks of the terms are listed in column 2. The rank of each term may be calculated by any technique, including the techniques discussed in the section "Calculating Rank."

At 320 squares "q^2" are calculated for each rank (see column 3). At 330 the sum of all the squares q^2 is formed (the result of this summation, for the example, is located in column 3, at the penultimate row). At 340, the square root of the sum of the squares is calculated (the result of this calculation is listed in column 3, in the last row). The squares q^2 are then divided by the norm of Q (see column 4). Next, the normed squares are sorted in descending order (see column 5). The cumulative partial sums of the sorted normed squares are formed at 370 (see column 6).

Terms of the specified document that are more likely to produce similar documents may be based on the list of the cumulative partial sums. This is because the terms with a lower partial sum may be more unique throughout the documents in the data repository; thus, the terms with the lower partial sums may be used to determine other documents in the data repository that might be similar to the specified document. A technique for producing similar documents, using the list of partial sums, involves forming a reduced query document. The reduced query document may include any number of terms that have a lower partial sum. One technique for determining which terms to include in the reduced query document involves including only those terms that have a corresponding partial sum lower than a certain threshold value. This technique may be referred to as "cutting off" the vector of partial sums where the vector of partial sums is the list of the partial sums.

At 380, the vector of partial sums is cut off where the partial sum exceeds a threshold value. The threshold value may be referred to as a "scope factor." In the example, the scope factor may be any number from 0 to 1 and may cut off any number of terms. For example, if the scope factor is 0.9, a document vector corresponding to the vector of partial sums is cut off after the fifth sorted term, "Spanish," since the cumulative partial sum for that term is 0.965, which is greater than 0.9. The scope factor may be input by a user or may be number that is predefined.

The "cut-off" document vector is then used to form the reduced query document. Because the cut-off document vector is shorter than the original, specified document, calculations of similarities between the query document and other documents are simplified.

In alternative implementations the method of shown in FIG. 3 may be composed of additional and/or different processes. For example, the method may exclude terms from the query that are determined to be less selective. Terms like "the" or "and" of the English language, may appear in many documents and therefore might not provide significant assistance in distinguishing similar documents. For any set of N documents, such terms appear in many of them, and therefore have high n, low (N/n), low IDF, and low rank. Additionally, functional equivalents may be used for some processes. For example, at 360 the normed squares may be sorted in ascending order instead of descending order and the cumulative partials sums may be calculated at 370 to produce the same results, in a different order. Similarly, the processes need not be performed in the order depicted.

Returning to FIG. 2, at 230 the query is executed such that the reduced query document is substituted for the specified document. Executing the query, such that the reduced query document is used, may reduce calculation overhead because when calculations of similarity are performed iteratively between the reduced query document and other documents, no iteration steps are required for terms that were excluded as a result of the method of forming the reduced query document.

At 240 a result of the query is provided to a user interface. The result may include, for example, any number of documents that are similar to the specified document, a list of references to similar documents, or an indication that no similar documents have been found. The user interface may be the user interface of 210.

Although the method of FIG. 2 is shown as being composed of four different processes, additional and/or different processes can be used instead. Similarly, the processes need not be performed in the order depicted. Thus, although a few implementations have been described in detail above, other modifications are possible. For example, other implementations of the vector space model may be used to model the data repository. Other implementations may be within the scope of the following claims.

The invention claimed is:

1. A method of executing a query on a computer for at least one document similar to a specified document, the method comprising:
receiving the query;
forming a reduced query document based on ranks of terms in the specified document, the forming comprising:
calculating a rank of at least one term in the specified query document,
calculating a square of each rank,
calculating a normalized rank for each square,
sorting a list of said normalized ranks,
calculating a partial sum for each normalized rank in the list of normalized ranks, and
including, in the reduced query document, terms corresponding to a partial sum above a threshold value;
generating a modified query based on the query and the reduced query document;
executing the modified query on a data repository to generate a set of results; and
providing a result from said generated set of results to a user interface.

2. The method in accordance with claim 1, wherein the result comprises a document that is similar to the specified document.

3. The method in accordance with claim 1, wherein the result comprises a list of references to documents that are similar to the specified document.

4. The method in accordance with claim 1, wherein the result indicates that no similar document was found in the data repository.

5. The method in accordance with claim 1, wherein forming the reduced query document based on ranks of terms in the specified document excludes terms that are less selective.

6. The method in accordance with claim 1, wherein the data repository is modeled in accordance with a vector space model and executing the modified query comprises calculating the similarity of the reduced query document with a comparison document in the data repository in accordance with a function $Q \cdot D/|Q|*|D|$ where Q is the reduced query document, D is the comparison document, $Q \cdot D$ is a scalar product of column vectors corresponding to each document such that each column is a vector including ranks of terms in the documents, and $|Q|*|D|$ is a normalization factor.

7. The method in accordance with claim 6, wherein the normalization factor is the product of the norms of the column vectors corresponding to each document calculated in accordance with an equation $sqrt(q1^2+ \ldots +qT^2) * sqrt(d1^2+ \ldots +dT^2)$ where sqrt signifies square root, q1 through qT are ranks of terms in the reduced query document, d1 through dT are ranks of terms in the comparison document, and T is the number of terms in an index of document vectors generated in accordance with the vector space model of the data repository.

8. The method in accordance with claim 6, wherein the scalar product of the column vectors is calculated in accordance with an equation $(q1.d1+q2.d2+ \ldots +qT.dT)$ where q1 through qT are ranks of terms in the reduced query document, d1 through dT are ranks of terms in the comparison document, and T is the number of terms in an index of document vectors generated in accordance with the vector space model of the data repository.

9. A computer-readable storage media embodying instructions to cause data processor to perform operations comprising:
receiving a query for at least one document similar to a specified document;
forming a reduced query document based on ranks of terms in the specified document, the forming comprising:
calculating a rank of at least one term in the specified query document,
calculating a square of each rank,
calculating a normalized rank for each square,
sorting a list of said normalized ranks,
calculating a partial sum for each normalized rank in the list of normalized ranks, and
including, in the reduced query document, terms corresponding to a partial sum above a threshold value;
generating a modified query based on the query and the reduced query document;
executing the modified query on a data repository to generate a set of results; and
providing a result from said generated set of results to a user interface.

10. The computer-readable media in accordance with claim 9, wherein the result comprises a document that is similar to the specified document.

11. The computer-readable media in accordance with claim 9, wherein the result comprises a list of references to documents that are similar to the specified document.

12. The computer-readable media in accordance with claim 9, wherein the result indicates that no similar document was found in the data repository.

13. The computer-readable media in accordance with claim 9, wherein forming the reduced query document based on ranks of terms in the specified document excludes terms that are less selective.

14. The computer-readable media in accordance with claim 9, wherein the data repository is modeled in accordance with a vector space model and executing the modified query comprises calculating the similarity of the reduced query document with a comparison document in the data repository in accordance with a function $Q \cdot D / |Q|*|D|$ where Q is the reduced query document, D is the comparison document, $Q \cdot D$ is a scalar product of column vectors corresponding to each document such that each column is a vector including ranks of terms in the documents, and $|Q|*|D|$ is a normalization factor.

15. The computer-readable media in accordance with claim 14, wherein the normalization factor is the product of the norms of the column vectors corresponding to each document calculated in accordance with an equation $sqrt(q1^2+\ldots+qT^2) * sqrt(d1^2+\ldots+dT^2)$ where sqrt signifies square root, q1 through qT are ranks of terms in the reduced query document, d1 through dT are ranks of terms in the comparison document, and T is the number of terms in an index of document vectors generated in accordance with the vector space model of the data repository.

16. The computer-readable media in accordance with claim 14, wherein the scalar product of the column vectors is calculated in accordance with an equation $(q1.d1+q2.d2+\ldots+qT.dT)$ where q1 through qT are ranks of terms in the reduced query document, d1 through dT are ranks of terms in the comparison document, and T is the number of terms in an index of document vectors generated in accordance with the vector space model of the data repository.

* * * * *